ELECTRIC MOTOR.
APPLICATION FILED MAR. 10, 1900.
1,106,513. Patented Aug. 11, 1914.
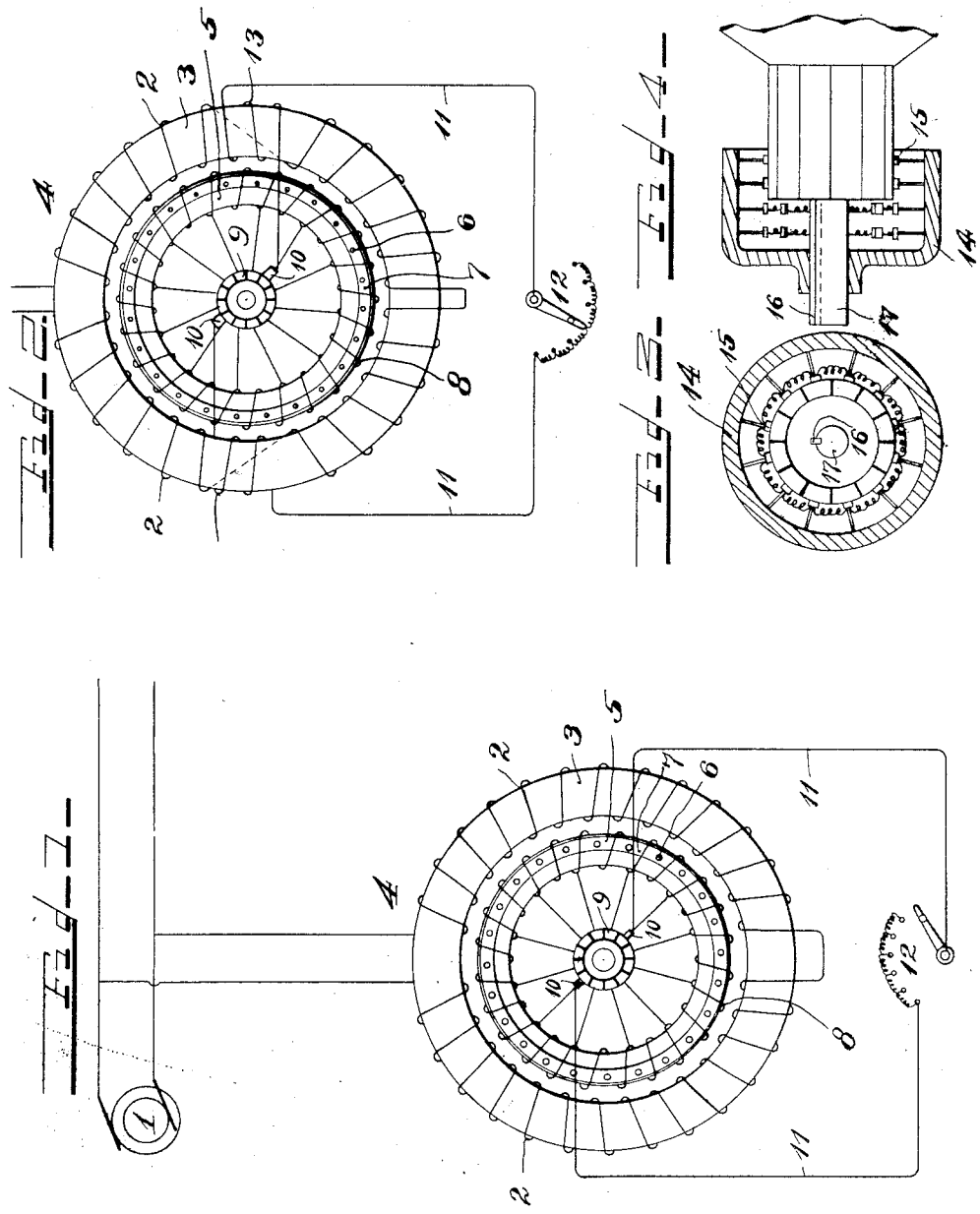
Witnesses
Max W. Zabel
Chas. J. Schmidt
Inventor
Dugald C. Jackson
By Charles A. Brown
Attorneys

UNITED STATES PATENT OFFICE.

DUGALD C. JACKSON, OF MADISON, WISCONSIN.

ELECTRIC MOTOR.

1,106,513.  Specification of Letters Patent.  Patented Aug. 11, 1914.

Application filed March 10, 1900. Serial No. 8,202.

*To all whom it may concern:*

Be it known that I, DUGALD C. JACKSON, a citizen of the United States, residing at Madison, in the county of Dane and State of Wisconsin, have invented a certain new and useful Improvement in Electric Motors, of which the following is a full, clear, concise, and exact description, reference being had to the accompanying drawings, forming a part of this specification.

My invention relates to induction motors, and more particularly to single phase induction motors, and has for its object the provision of improved means for starting and operating motors of this class.

It is well known that auxiliary means have to be provided in connection with single phase induction motors which are adapted to start the same from a state of rest, the induction motor armature operating independently when once started. These means, however, introduce complications and irregularities, and it is the prime object of this invention to provide means for overcoming difficulties due thereto.

In my Patent No. 818,027, of April 17th, 1906, I have shown an improved method of starting single phase induction motors from a state of rest. In my present invention I provide means for accomplishing the same object by the aid of an auxiliary winding placed upon the armature, said auxiliary winding serving to start the same from a state of rest.

In my application, Serial No. 442,994, I have shown a method of operating dynamo electric machines related to the invention disclosed herein.

Generally speaking, my invention consists in a suitably energized field ring for the said induction motor, the usual distributed form of winding being preferably employed. I preferably provide upon the armature an ordinary normally short-circuited, or squirrel-cage, induction motor armature winding, and in addition I place thereon an auxiliary winding which is preferably of some suitable direct current form. I have here illustrated the application to a winding such as is disclosed in the patent to Anthony, Jackson and Ryan, No. 389,352. This auxiliary winding is advantageously of the so-called closed circuit type in which the armature core is encircled by a continuous conductor whose terminals are preferably connected together, the said conductor being tapped at intervals and electrically connected to a commutator. The commutator brushes are preferably electrically united with each other, either through a metallic conductor or auxiliary coils placed upon the field winding, an adjustable resistance being also included, preferably, in circuit therewith. The brushes may preferably be placed approximately midway between the neutral point and the point of highest potential upon the commutator. When alternating current is impressed upon the field windings, the motor will operate on the so-called repulsion principle due to the auxiliary winding as is well understood. This latter winding gives a strong starting torque, and after the machine is in operation, the brushes may be raised, or circuit between the brushes broken in some other suitable manner, and the motor operated as a plain single phase induction motor; or the motor may be continuously operated, using both windings. The auxiliary winding may be short-circuited through or back of the commutator if desired. In order to materially reduce the amount of sparking which ordinarily occurs in the use of such a winding as the auxiliary winding mentioned, I preferably make electrical connections directly between the segments of the commutator through portions of resistance material, such as German silver wire. The amount of torque is thereby slightly decreased, as well as the sparking; but this reduction of torque has no particular disadvantage especially as the machine is adapted to operate as a plain induction motor with short-circuited armature windings after it has reached its normal speed, and the starting torque exerted by the auxiliary winding may be made what is desirable. I preferably so connect the resistance in the connections between the commutator segments that the magnitude thereof which is included between bars may be variable at will, thereby providing an easy and effective means for controlling the torque of the motor. This part of the invention may be used alone without the main or short-circuited winding on the armature.

The method or process herein disclosed is described and claimed in my copending application Serial No. 442,994, filed May 2nd, 1903.

I attain these objects and others, by means of my invention, the preferred embodiment of which is illustrated in the accompanying drawing, in which—

Figure 1 is a diagrammatic view of a motor arranged in accordance with my invention; Fig. 2 shows a modification of the connections of the auxiliary armature winding; Fig. 3 is a detail view of the commutator and short-circuiting means; Fig. 4 is a longitudinal sectional view thereof.

Like characters of reference indicate like parts in the several figures.

I have shown a source of alternating current 1 as supplying current to the distributed windings 2, 2, of a field ring 3 of an induction motor 4. I provide a short-circuited winding, in this instance shown as a squirrel-cage, upon an armature 5 of the induction motor 4, the said winding consisting of conductors 6, 6, and a short-circuiting ring 7. This winding is adapted to operate the machine as a single phase induction motor when the armature has started from a state of rest. In order to start the same I provide an auxiliary winding upon the same armature, the said auxiliary winding consisting preferably of conductors 8, 8, which are connected at intervals to a commutator 9. I provide brushes 10, 10 which are adapted to engage the commutator, the said brushes being shown as approximately midway between the neutral point and the point of highest potential upon the said commutator, circuit through the brushes being closed by means of a metallic conductor 11, through an adjustable resistance 12. The resistance 12 serves to regulate the amount of current passing through the auxiliary winding, thereby serving, if desired, to govern the speed and the torque exerted by the said motor. The auxiliary coil serves to start the machine, and the circuit through the said auxiliary winding may, after the machine is in operation, be opened in any suitable manner, thereby allowing only the short-circuited winding to act, or the motor may be operated under the influence of both of said windings. It is to be noted that the circuit which connects the brushes is substantially a short circuit, in other words, it is an energy dissipating circuit, the current which flows in this circuit serving only the purposes of torque production as distinguished from a current transforming energy into useful work outside the motor. If the machine is designed to exert a stronger torque at times than can be supplied by the short-circuited winding alone, it is advantageous to utilize the torque which may be supplied by the continuous winding in conjunction with the other winding. The commutator of the auxiliary winding must then be short-circuited so that said auxiliary winding acts similarly to a closed circuited induction motor winding. The commutation of the current induced in the auxiliary winding is attended with considerable difficulties as the commutation cannot take place along the plane which would insure sparkless commutation. Under certain conditions excessive sparking will therefore result at the commutator, which is due generally to the reversal of the current in the commutator connections and leads, the magnetic field frequently tending to sustain the arc. It is advisable not to break the current too abruptly at the commutator segments, and for this reason, as well as others, I find it advisable to insert a resistance between adjacent commutator segments. In order to increase the efficiency of the operation of this winding, and to materially decrease the sparking at the commutator caused thereby, I provide a spider 14 which carries contacts of German silver wire 15, 15, the said spider being movable longitudinally upon a spline 16, placed upon an armature shaft 17. By moving this spider longitudinally with respect to the commutator on the spline upon the armature shaft, the resistance between the commutator bars may be varied through any desired range, as from an open circuit to a dead short-circuit. The motor is started with some resistance between the commutator segments, and if it is desired to use an auxiliary coil in addition to the short-circuited winding when the motor has reached its speed, the spider 14 is moved to short-circuit the commutator. If, however, it is desired to use only one winding after the motor has been brought to speed, the spider is moved away from the commutator to open the circuit between the commutator segments. This introduction of resistance slightly reduces the amount of torque as well as reducing the amount of sparking; but this reduction of the torque does not injuriously affect the operation of the machine. An easy method is hereby provided for changing the speed and torque exerted by the motor through the agency of the said resistance.

In Fig. 2 I have shown a slight modification in the arrangement of the circuit connecting the brushes 10, 10, the conductor 11 serving to include coils 13, 13, upon the field ring 3, the said coils 13, 13 constituting an auxiliary field winding and serving to influence the amount of current traversing said auxiliary armature winding, thereby influencing the operation of the machine. The coils 13, 13 act as secondary coils to the field coils 2. Any well known means for changing the torque due to the short-circuited winding 6, 6, may be employed, as will be readily understood by those skilled in the art.

The operation of my improved motor will now be readily understood When the armature is in a state of rest, the spider 14 short-circuits the commutator segments. Thus the motor is to be started. The spider is moved toward the left, thereby increasing the resistance between the commutator segments and increasing the torque When the motor is in full operation the spider may be wholly removed from the commutator, or may be moved so as to short-circuit all the segments or be placed at any desired intervening position, as hereinbefore set forth.

I have thus shown in the preferred embodiment of the invention, a plurality of closed circuits corresponding in number with the armature coils, each closed circuit including an armature coil, a resistance and the armature connections with the commutator between which the resistance intervenes, the resistance thus bridging the commutator segments and the connections of the armature with the commutator.

It will be apparent that a brush bearing upon the commutator between the connections of the corresponding armature coil with the commutator is in parallel with the armature coil and the resistance It will also be apparent that by providing resistances which join adjacent segments of the commutator, I provide what may be termed a practically continuous conducting ring or closed circuit containing sufficiently high resistance for the purpose desired, the resistances bridging the adjacent commutator segments forming paths that are preferably permanently closed. It will be seen that I have provided an improved machine whose armature has two windings, one a short-circuited winding and the other a commutated winding, the short-circuited winding having all of its coils electrically joined.

The system disclosed is a single phase system of power transmission and two brushes are indicated to correspond to such single phase.

I have herein shown and particularly described the preferred embodiment of my invention; but I do not wish to limit myself to the precise construction and arrangement herein shown, as modifications thereof may readily be made by those skilled in the art without departing from the spirit of my invention, and I therefore claim as new and desire to secure by Letters Patent:—

1. An alternating current motor having an armature provided with suitable conductors, connections whereby a repulsion motor torque may be produced therein and other connections whereby an induction motor torque may be simultaneously produced in the same conductors.

2. In an alternating current motor provided with a main winding and a commutated winding, means for short-circuiting said commutated winding on an axis to produce repulsion motor torque and means for simultaneously partially short-circuiting the several coils of the commutated winding.

3. In an alternating current motor provided with armature conductors, means for inducing current in said armature conductors, means for causing part of said current to flow through said conductors so as to produce repulsion motor torque means for causing part of said current flowing through said conductors to produce induction motor torque and means for varying the flow of either part of said current.

4. In a dynamo electric machine, the combination with a field magnet of an associated armature core, a winding on said armature core, a commutator to which said winding is connected at suitable intervals, brushes electrically connected together and bearing on said commutator at points removed from the plane of commutation in order to afford repulsion motor torque, and a circuit independent of the commutator and brush circuit for conveying a portion of the current flowing in the armature winding.

5. An alternating current dynamo electric machine having a field magnet with alternating poles fixed in angular position, an armature core subjected to the influence of the field magnet, a commutated armature winding, a commutator therefor, brushes bearing on said commutator, a short circuiting conductor connecting said brushes, and resistances joining commutator segments, said resistances being adapted for inclusion in closed circuit with the corresponding armature coils whereby a commutator brush when bearing upon two commutator segments is brought into parallel relation with the resistances and armature coils connected therewith.

6. An alternating current motor provided with an armature core, an armature winding, a field core and field winding directing a single phase alternating magnetic field upon said armature core and winding, a commutator for the armature winding, electrically short-circuited brushes bearing upon the commutator, and resistance by-paths or cross circuits connected between appropriate commutator segments so as to afford bridges in parallel with the corresponding parts of the armature winding 7. In an alternating current motor, the combination with the armature and field portions thereof, of a commutator for the armature having connections therewith, resistances electrically connected with the commutator in parallel with the armature coils, each resistance forming with the corresponding armature coil a closed circuit, brushes bearing upon the commutator so as to afford repulsion motor torque, and an external circuit connecting said brushes, substantially as described.

8. In an electric power system, the combination with the source of single phase alternating current of an alternating current motor having a field magnet and winding producing a single phase alternating field, a suitable armature subjected to said magnetic field, a winding on said armature, a commutator for said armature, said commutator comprising suitable segments and the said winding being connected at regular intervals with said segments, brushes bearing on said commutator at points intermediate between the neutral plane and the plane of commutation, an external electrical circuit connecting said brushes with one another, and parallel resistances bridging between the segments of the commutator whereby said brushes when bearing upon two commutator segments are brought into parallel relation with the resistances and armature coils connected therewith.

9. In a dynamo electric machine, the combination with an armature having a commutated winding, of a commutator therefor, variable resistances connecting the several adjacent commutator segments with one another, and brushes electrically connected together and bearing on said commutator at points displaced from the plane of commutation to afford repulsion motor torque.

10. In a dynamo electric machine, the combination with an armature having a commutated winding, of a commutator for said winding, resistances interposed between adjacent commutator bars, brushes bearing on said commutator, and a short circuit connecting said brushes with one another.

11. In an alternating current motor, the combination with a field winding, of an armature associated therewith, said armature being provided with a suitable winding, means for including variable resistances in parallel circuit between armature coils, a commutator connected with said winding, and brushes electrically connected together and bearing on said commutator at points displaced from the plane of commutation so as to afford repulsion motor torque.

12. In an alternating current dynamo electric machine, the combination with field magnets, of an armature therefor, a normally short-circuited induction motor winding provided upon said armature, a second winding provided upon said armature, a commutator for said second winding, brushes bearing on said commutator at points removed from the plane of commutation, an external circuit connecting said brushes with one another, and means for including a variable resistance between adjacent bars of said commutator.

13. In an alternating current dynamo electric machine, the combination with field magnets, of an armature therefor, a commutated winding on said armature, a commutator for said winding, brushes bearing upon said commutator, said brushes being connected with a circuit having an alternating electromotive force of the frequency of the current in the field magnet, and means for connecting variable resistances between bars of said commutator.

14. In combination, a field magnet of an alternating current dynamo electric machine, a relatively rotatable armature associated therewith, a normally short-circuited winding on said armature, a commutated winding on said armature, a commutator for said commutated winding, brushes bearing on said commutator, a circuit deriving energy from the main circuit and supplying it through said brushes to the commutated winding, and resistances electrically connected with the commutator in parallel with the armature coils.

15. In an alternating current dynamo electric machine, the combination with field magnets, of an armature therefor, a commutated winding on said armature, a commutator to which the armature winding is connected, brushes bearing on said commutator at points intermediate between the neutral plane and the plane of commutation, a circuit connecting said brushes with one another, a suitable controller included in said circuit, and means for connecting and varying a resistance between the adjacent bars of said commutator.

16. In combination, a field magnet of an alternating current motor connected with a source of alternating current, a relatively rotatable armature associated with said field magnet, a reëntrant winding on said armature, a commutator whose segments are connected with said armature, resistances bridging between the commutator segments, brushes bearing on said commutator, and a circuit for supplying through said brushes a current of the frequency of said source.

17. In a dynamo electric machine, the combination of a field magnet connected with a source of alternating current, an armature core associated with said field magnet, a winding on said core, a commutator connected at suitable intervals with said winding, resistances partially short-circuiting said winding to afford induction motor torque when the machine is running, brushes bearing on said commutator to afford repulsion motor torque when the machine is running, a circuit for supplying through said brushes a current having the frequency of a source with which the machine is connected, and a suitable controller in said brush circuit.

18. In an induction motor, the combination with field poles, of an armature provided with a normally short-circuited induction motor winding, an auxiliary winding also provided upon said armature, a commutator in electrical connection with said auxiliary winding, the auxiliary winding being included in circuit with the said commutator, brushes adapted for engagement with the said commutator, an external circuit connecting the brushes, variable resistances electrically connected with the commutator in parallel with the armature coils, and supplemental field magnet coils applied to the field magnet, said supplemental field coils being connected in the circuit uniting the said brushes for the purpose of influencing the amount of current passing through said auxiliary winding, substantially as described.

19. In an induction motor, the combination with field poles, of an armature provided with a normally short-circuited induction motor winding, an auxiliary winding also provided upon the said armature, a commutator in electrical connection with said auxiliary winding, the auxiliary winding being included in circuit with said commutator, brushes adapted for engagement with the said commutator, an external circuit electrically connecting the brushes, means for controlling the external circuit through said brushes, and variable auxiliary resistances adapted for inclusion between adjacent commutator segments.

20. In an alternating current motor, the combination with field magnets, of an armature therefor, a winding provided upon said armature, a commutator for said winding, brushes adapted to engage the commutator, a frame longitudinally movable with relation to said commutator and resistance associated with said frame, said resistance adapted by the movement of said frame to be variably included between adjacent segments of said commutator.

21. In a dynamo electric machine, the combination of an armature, a winding provided upon the armature, a commutator for said winding, and means movable longitudinally of the said commutator and associated therewith for including a varying amount of resistance between adjacent segments of the said commutator, substantially as described.

22. In a dynamo electric machine, the combination of an alternating field magnet, an armature having a suitable winding, a commutator for said winding, brushes electrically connected together and bearing on said commutator at points removed from the plane of commutation in order to afford repulsion motor torque, and means co-operatively associated with said commutator for including a varying amount of resistance between adjacent bars of the commutator.

23. In an alternating current motor provided with armature conductors, means for inducing current in said conductors, said conductors providing a part of a circuit in which repulsion motor torque is thus produced and a part of a circuit in which induction motor torque is thus simultaneously produced, and means in each of said circuits for regulating the flow of current therein.

24. In an alternating current motor provided with armature conductors, means for inducing current in said conductors, said conductors providing a part of a circuit in which repulsion motor torque is thus produced and a part of a circuit in which induction motor torque is thus simultaneously produced, and means in said latter circuit for controlling the flow of current therein.

In witness whereof, I hereunto subscribe my name this twenty-fourth day of February, A. D. 1900.

DUGALD C. JACKSON.

Witnesses:
 FLORENCE WICKLIN,
 MAX W. ZABEL.